United States Patent
Rahn

[19]

[11] Patent Number: 5,848,213
[45] Date of Patent: Dec. 8, 1998

[54] LOW SHUPE BIAS FIBER OPTIC ROTATION SENSOR COIL

[75] Inventor: John P. Rahn, West Hills, Calif.

[73] Assignee: Litton Systems, Inc., Woodland Hills, Calif.

[21] Appl. No.: 885,577

[22] Filed: Jun. 30, 1997

[51] Int. Cl.⁶ .................................................... G02B 6/04
[52] U.S. Cl. ............................ 385/115; 385/147; 385/12
[58] Field of Search ............................. 385/12, 115, 116, 385/121, 147, 114

[56] References Cited

U.S. PATENT DOCUMENTS 5,303,323   4/1994   Mezei ........................................ 385/147

OTHER PUBLICATIONS

Nicholas J. Frigo, Fiber Optic and Laser Sensors, I"Compesation of Linear Sources of Non–Reciprocity in Sagnac Interferometers", Proc. SPIE, vol. 412, 1983.

Cassie M. Lofts et al., Optical Engineering "Investigation of the Effects of Temporal Thermal Gradients in Fiber Optic Gyroscope Sensing Coils", vol. 34 No. 10, Oct. 1995.

Freidemann Mohr, Journal of Lightwave Technology, "Thermooptically Induced Bias Drift in Fiber Optical Sagnac Interferomters", vol. 14 No. 1, Jan. 1996.

Paul B. Ruffin et al., Optical Engineering, "Reduction of Nonreciprocity Noise in Wound Fiber Optic Interferometers", vol. 33, No. 8, Aug. 1994.

Paul B. Ruffin et al., SPIE vol. 1585 Fiber Optic Gyros: 15th Anniversary Conference (1991), Proceedings Only: "Analysis of a Temperature and Stress Effects in Fiber Optic Gyroscopes".

D.M. Shupe, Optical Society of America"Thermally Induced Non–Reciprocity in the Fiber Optic Interferometer" Applied Optics, vol. 19(5)1980.

*Primary Examiner*—Hung N. Ngo
*Attorney, Agent, or Firm*—Lynn &Lynn

[57] ABSTRACT

A fiber optic ribbon is used for forming a sensing coil that may be used in a Sagnac effect fiber optic rotation sensor. The fiber optic ribbon provides a single radial layer per turn of the coil winder and can be made to have a quadrupole spatial turn distribution.

5 Claims, 1 Drawing Sheet

2

LOW SHUPE BIAS FIBER OPTIC ROTATION SENSOR COIL

BACKGROUND OF THE INVENTION

This invention relates generally to fiber optic rotation sensors and particularly to techniques for forming sensing coils used in such sensors to reduce the effects of thermally induced nonreciprocities. This invention relates particularly to the use of a fiber optic ribbon to form a sensing coil for a fiber optic rotation sensor.

Theoretical analyses of the fiber optic rotation sensor have led to the conclusion that this sensor could measure rotation rates to 0.01°/h or better. These analyses assume that the limiting noise in the ring interferometer is shot noise at the photodetector. This sensitivity range would permit the fiber optic rotation sensor to be used as a navigation-grade gyro in competition with laser gyros and conventional spinning-mass gyros.

Experimental results show that the sensitivity is not limited by shot noise but rather by non-reciprocity noise (i.e., slowly varying bias) in the fiber optic sensing coil and other parts of the optical path. This non-reciprocity noise can be greatly reduced by ensuring that the interferometer uses only a single polarization state in a single-mode birefringent fiber. However, even when a single mode and single state of polarization are used, the accuracy of the fiber optic rotation sensor can be limited by a thermally induced nonreciprocity in the fiber coil. This thermally induced nonreciprocity is known as the Shupe effect and is described in Shupe, "Thermally induced nonreciprocity in the fiber-optic interferometer," *Applied Optics*, Vol. 19(5), 654–655 (1980).

The Shupe effect in fiber optic rotation sensors is caused by thermally-induced time-varying optical pathlength asymmetry. The Shupe effect occurs when corresponding segments of the fiber equidistant from the coil center have different thermal rate and stress change rate environments. Thermally induced nonreciprocity can occur if there is a time-dependent temperature gradient along the fiber. Nonreciprocity arises when the corresponding wave fronts in the two counterrotating beams (e.g., pulses of light that enter the coil at the same time but in different directions) traverse the same region of the fiber at different times. If the fiber's propagation constant varies at different rates along the fiber, the corresponding wave fronts in the two counterrotating beams traverse a slightly different effective optical path. This creates a nonreciprocal phase shift that is indistinguishable from the phase shift caused by rotation.

Quadrupole coil winding techniques that mitigate the Shupe effect are described in the paper by N. J. Frigo, "Compensation of Linear Sources of Non-reciprocity in Sagnac Interferometers," which appeared in *Fiber Optic and Laser Sensors I*, Proc. SPIE Vol. 412, pp. 268–271 (1983). Quadrupole coil winding places all segments of the fiber that are equidistant from the coil center radially adjacent to each other. Quadrupole coil winding requires a high degree of skill from the coil winding operator to achieve satisfactory results. Even with the most skilled operators, a certain number of misplaced turns has been found to be probable, which degrades the Shupe bias performance of the typical quadrupole-wound coil.

SUMMARY OF THE INVENTION

The present invention reduces the probability of winding defects by providing a fiber optic ribbon for forming the sensing coil. Fiber optic ribbons provide a single radial layer per turn of the coil winder and can be made to have a quadrupole spatial turn distribution similar to the previous quadrupole winds.

The method according to the present invention for forming sensing coil of optical fiber for a fiber optic rotation sensor, comprises the steps of arranging a plurality of optical fibers 1, 2, . . . N to be parallel to one another in a planar array and encasing the plurality of the optical fibers in a flexible material to retain them in parallel relationship to one another to form a ribbon of the optical fibers having a pair of ribbon ends. The ribbon is rolled into a spiral, and the ends of the ribbon are brought into contact. Adjacent ends of the fiber ends in the ribbon are butt spliced together to form an optical fiber coil having a clockwise input lead and a counterclockwise input lead.

In a very simple implementation of this concept, the fiber ends to be spliced preferably are arranged such that one end is laterally displaced by one fiber with respect to the other end. In a more desirable implementation, the splicing order of the fiber ends to be spliced preferably is permuted to provide a quadrupole distribution along the axial direction of the coil. The splicing order preferably is permuted such that light input from the clockwise input lead propagates inward in a first selected spiral of the coil and light input from the clockwise lead propagates outward in a spiral adjacent to the selected coil.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
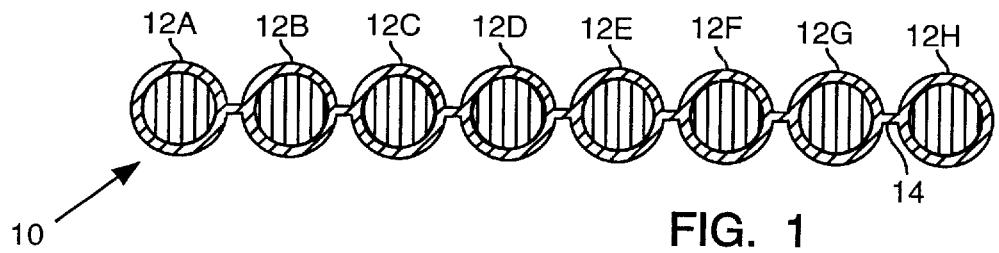
FIG. 1 is a cross-sectional view of a fiber ribbon.

As shown in FIG. 1, a fiber ribbon 10 is comprised of a planar array of N parallel optical fibers 12A, 12B, . . . 12N. The optical fibers 12A, 12B, . . . 12N preferably are held together by a flexible plastic material 14 that encases the optical fibers 12A, 12B, . . . 12N. The fiber ribbon 10 is shown to have eight fibers only for purposes of illustrating the basic structure of a fiber ribbon. Fiber ribbon can be produced economically and accurately and is presently used in local area networks.

Figure 2:
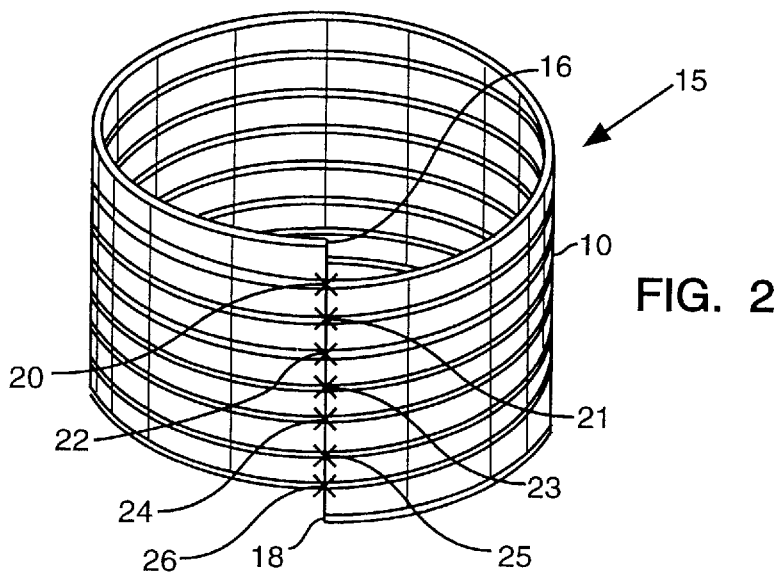
FIG. 2 is perspective view of a coil according to the present invention formed with a fiber ribbon.

Forming a simple fiber ribbon coil 15 involves rolling the ribbon 10 into a multilayered spiral. Then, for a simple implementation, the outer end of the ribbon 10 is brought back into contact with the inner end displaced by one fiber with respect to the inner end. FIG. 2 illustrates this process for a single layer coil. These steps leave one clockwise (CW) free end 16, one counterclockwise (CCW) free end 18 and N-1 splices 20–26 to be formed. The splices 20–25 are indicated in FIG. 2 by pairs of crossed lines.

Winding M layers in the coil produces M*N turns. The CW propagating light wave for this design spirals outward through the first spiral, then is brought back in a simple translation to the inner radius from which it spirals outward again, etc.

The simple splicing technique discussed above gives the same radial distribution for both the CW and CCW turns.

Figure 3:
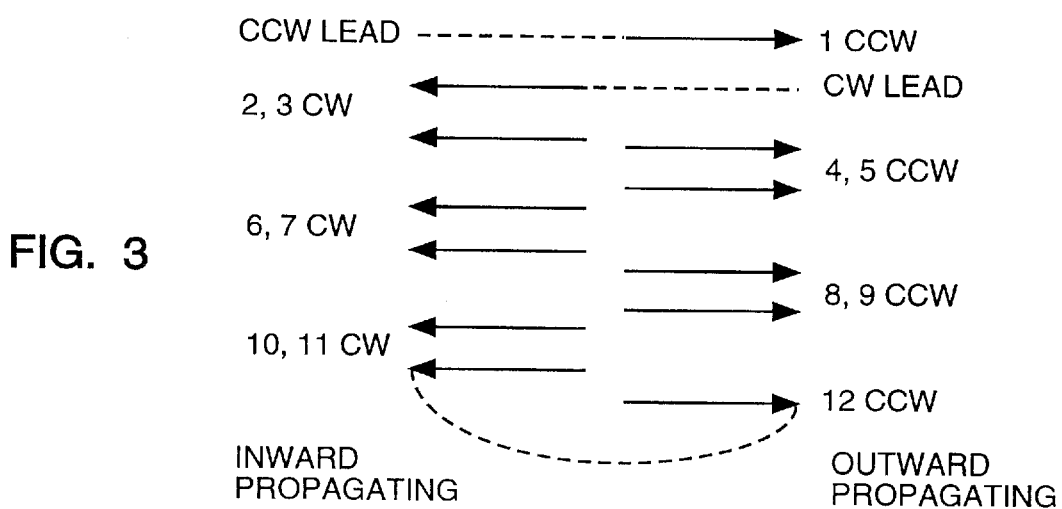
FIG. 3 is a diagram that illustrates direction of propagation of optical signals in a quadrupole-like coil formed with a fiber ribbon.

However, in the axial direction the CW fiber segments are on one end, for example the bottom, and the CCW segments are on the top, which would result in Shupe bias if an axial temperature gradient exists. To solve this problem, one needs to permute the splicing order from a simple advancement along the axial direction into an order that gives a quadrupole spiral distribution along the axial direction. According to Frigo's teachings, in a quadrupole coil the light propagates CCW in the outer two spirals 1 and 4 and propagates CW in the inner two spirals 2 and 3. To do this, assume that the light from the CW lead of the fiber optic rotation sensor is allowed to propagate CCW outward through the top spiral, spiral 1. Then the light from the CCW lead of the fiber optic rotation sensor will be injected in spiral 2 in the other direction (CW) and propagate inward through the adjacent spiral and, again, inward through the next adjacent spiral 3. Then the CW lead light that came out of spiral 1 will be injected into spiral 4 and propagate outward as shown in FIG. 3. This completes one quadrupole period. This process of interchanging splicing directions continues until the bottom side of the ribbon is reached as is shown in FIG. 3 for 12 fibers or 3 quadrupoles. A quadrupole wind is therefore created along the axial direction.

The number of fibers in the ribbon must be evenly divisible by four. This should give a Shupe bias immunity that is approximately as high as present radial quadrupole wound coils. The use of a ribbon fiber to form the sensing coil has the advantages of reducing coil winding labor and improving the accuracy of the turn distribution. It is generally required that no splice be within a source coherence length of the center of the fiber optic rotation sensor coil. Thus, extra lead length will be required at the nominal center splice to displace it. This causes a slight Shupe bias due to lead trimming error in the coil and should not be significant since the usual source has a coherence length that is only about a millimeter. Therefore only a few millimeters of lead unbalance is needed.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. A method for forming sensing coil of optical fiber for a fiber optic rotation sensor, comprising the steps of:

arranging a plurality of optical fibers 1, 2, . . . N to be parallel to one another in a planar array;

encasing the plurality of the optical fibers in a flexible material to retain them in parallel relationship to one another to form a ribbon of the optical fibers having a pair of ribbon ends; and rolling the ribbon into a spiral;

bringing the ends of the ribbon into contact;

forming butt splices between selected fiber ends to form an optical fiber coil having a clockwise input lead and a counterclockwise input lead.

2. The method of claim 1 including the step of selecting the selected fiber ends to be spliced by arranging the ribbon such that one end is laterally displaced by one fiber with respect to the other end.

3. The method of claim 1 including the step of selecting the fiber ends to be spliced includes the step of permuting the splicing order to provide a quadrupole distribution along the axial direction of the coil.

4. The method of claim 3 including the step of permuting the splicing order such that light input from the clockwise input lead propagates inward in a first selected spiral of the coil and light input from the clockwise lead propagates outward in a spiral adjacent to the selected coil.

5. A fiber optic coil, comprising:

a plurality of optical fibers 1, 2, . . . N arranged to be parallel to one another in a planar array;

a flexible material formed to encase the plurality of the optical fibers to retain them in parallel relationship to one another to form a ribbon of the optical fibers having a pair of ribbon ends; and a spiral formed in the ribbon of optical fibers; and a plurality of butt splices formed between ends of selected fiber in the fiber ribbon to form an optical fiber coil having a clockwise input lead and a counterclockwise input lead.

* * * * *